US005929872A

United States Patent [19]

Greene

[11] Patent Number: 5,929,872

[45] Date of Patent: Jul. 27, 1999

[54] METHOD AND APPARATUS FOR MULTIPLE COMPOSITING OF SOURCE DATA IN A GRAPHICS DISPLAY PROCESSOR

[75] Inventor: Spencer H. Greene, Palo Alto, Calif.

[73] Assignee: Alliance Semiconductor Corporation, San Jose, Calif.

[21] Appl. No.: 08/823,004

[22] Filed: Mar. 21, 1997

[51] Int. Cl.[6] .......... G06F 13/00

[52] U.S. Cl. .......... 345/524; 345/525

[58] Field of Search .......... 345/523–525, 345/507–509, 511, 526

[56] References Cited

U.S. PATENT DOCUMENTS

| | | | |
|---|---|---|---|
| 4,763,251 | 8/1988 | Kauffmann et al. | 364/200 |
| 4,837,563 | 6/1989 | Mansfield et al. | 340/732 |
| 4,845,656 | 7/1989 | Nishibe et al. | 345/525 |
| 4,933,878 | 6/1990 | Guttag et al. | 364/521 |
| 5,437,011 | 7/1995 | Guttag et al. | 345/515 |
| 5,479,605 | 12/1995 | Saitoh | 395/164 |
| 5,487,051 | 1/1996 | Providenza et al. | 365/233 |
| 5,533,185 | 7/1996 | Lentz et al. | 345/524 |

OTHER PUBLICATIONS

"Bit Block Transfer Graphics Configuration", *COMPAQ DESKPRO386/25e /20e Personal Computer—Technical Reference Guide*, pp. 85–216, Mar. 12, 1991.

*Computer Graphics Principles and Practice* (Second Edition), Foley, Vandam, Feiner and Hughes, Addison–Wesley Publishing Company, Inc., 1993, pp. 56–60.

*Programmer's Guide to the EGA, VGA, and Super VGA Cards* (Third Edition), Richard F. Ferraro, pp. 707–712.

*Primary Examiner*—Kee M. Tung
*Attorney, Agent, or Firm*—Abdy Raissinia

[57] ABSTRACT

A Blt accelerator method and apparatus (10) are disclosed. A sequencing engine (18) generates appropriate source and destination addresses in response to values stored in host addressable registers (16). Data are read into a storage unit (22) in an initial Blt operation. In subsequent Blt operations data are read from a source data location in combination with the data from the storage unit (22) into an arithmetic logic unit (ALU) (20). The ALU (20) performs a selected arithmetic/logic operation on the input data and stores the result back in the storage unit (22). In this manner, consecutive, subsequent, chained Blt operations may accumulate data. Shift circuits (34) and saturation add capabilities of the ALU (20) are further provided along with methods for the acceleration of pixel filtering, interpolation, and blending, as well as motion compensation in MPEG decoding.

9 Claims, 8 Drawing Sheets all one Blt operation

FIGs. 2a-2b Standard Blt Sequence (Source Operand Only)

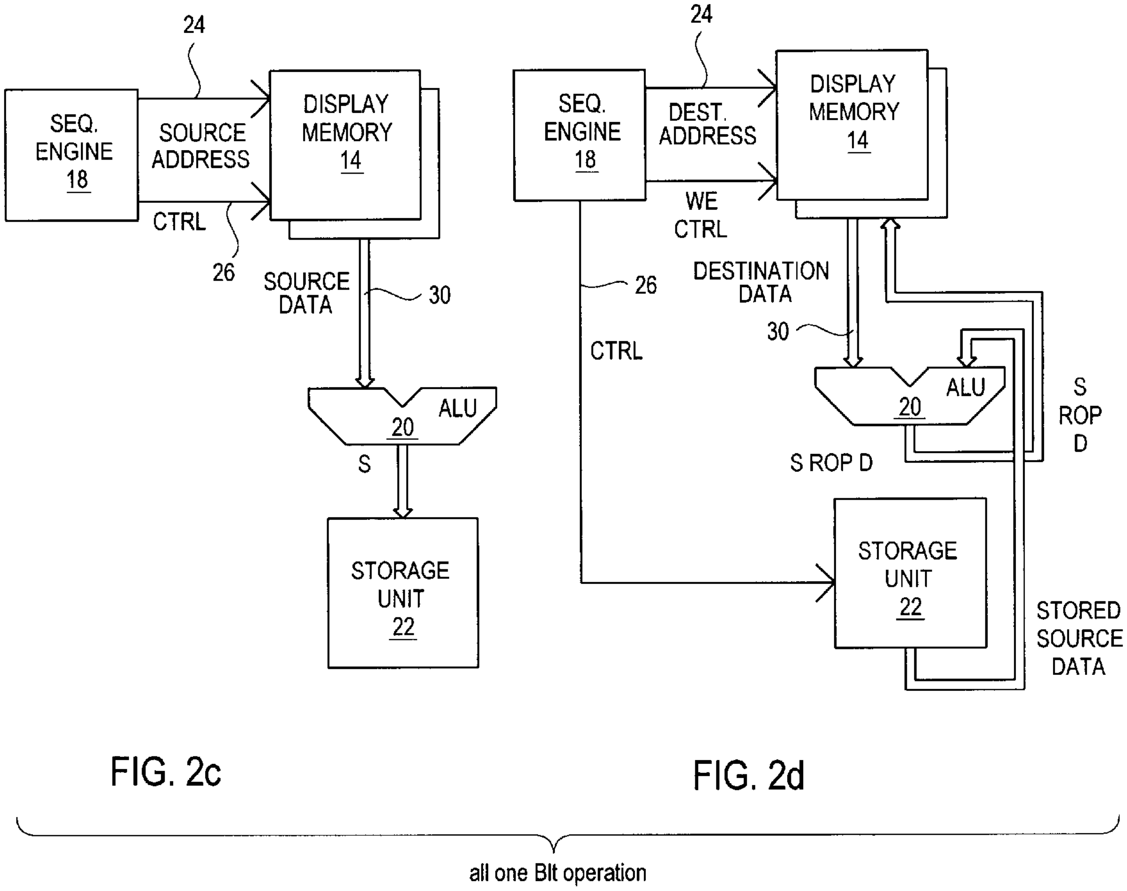
FIGs. 2c-2d Standard Blt Sequence (Source & Dest. Operands)

METHOD AND APPARATUS FOR MULTIPLE COMPOSITING OF SOURCE DATA IN A GRAPHICS DISPLAY PROCESSOR

TECHNICAL FIELD

The present invention relates generally to computer graphics systems, and more particularly to block transfers (Blt) and raster operations in computer graphics systems.

BACKGROUND OF THE INVENTION

In its most basic form, a bit block transfer (often referred to as a "bitBlt", "pixel Blt" or simply a "Blt") transfers a block of data from one portion of a graphics display memory to another. A series of source addresses are generated along with a corresponding series of destination addresses. Source data are read from the source addresses, and then written to the destination addresses. In addition to simply transferring data, a Blt operation may also perform a logical operation on the source data and other operand(s) (often referred to as a raster operation, or rop). Rops and Blts are discussed in *Computer Graphics Principles and Practice,* Second Edition, by Foley, VanDam, Feiner and Hughes, Addison-Wesley Publishing Company, Inc., 1993, pp. 56–60. Blts are commonly used in creating or manipulating images in computer display systems.

While Blts can be performed by a host processor by way of Blt software, many computer systems include specialized hardware (such as a graphics processor) for performing such functions, along with other graphics operations. The particular hardware that undertakes Blt and related operations is commonly referred to as a Blt engine. To use a typical Blt engine, the Blt operation is first set-up by loading a number of registers with parameter information for the Blt, such as the source and destination locations, and the type of rop. The Blt engine is then activated by a write start command. Blt engines typically include a Blt address generator for generating display memory addresses. Accordingly, in graphics applications, a Blt operation between source and destination locations that are both within the display memory ("screen-to-screen" Blt) requires no other host action once the Blt is initiated, and host-to-screen Blts require only that the host supply or receive the block data.

The implementation of a rop in conjunction with a Blt operation is typically performed by coupling source and/or destination data to one or more logic circuits which perform a logical operation according to a rop command previously loaded in the set up registers. There are numerous possible types of rops. See Richard F. Ferraro, *Programmer's Guide to the EGA, VGA and Super VGA Cards,* Third Edition, Addison-Wesley Publishing Company, Inc., 1994, pp. 707–712. In addition to standard logic rops, arithmetic addition or subtraction has been implemented in the Blt data path in U.S. Pat. No. 4,933,878 issued to Guttag et al. on Jun. 12, 1990.

From the above general description and cited prior art it is shown that basic Blt operations (with a rop) include four general steps: reading source data from the source location to a temporary data store, optionally reading destination or other operand data from its location, performing the rop on the data, and writing the result to the destination location.

While conventional Blt engine approaches provide considerable acceleration of two dimensional display rendering tasks, computer applications can benefit from more sophisticated functions on graphics data.

SUMMARY OF THE INVENTION

It is an object of the present invention to increase the acceleration capabilities of a graphics processor.

It is another object of the present invention to provide an additional hardware operation to a graphics processor that is applicable to a wide variety of image processing tasks.

According to the present invention, a graphics BLT engine includes a hardware "accumulate BLT" function that stores the resulting values from a Blt operation for use in a subsequent Blt operation.

Further according to the present invention the data write to a destination location in memory from the resulting Blt operation can be inhibited.

Further according to the present invention the hardware function allows data read from the memory to be binary shifted prior to any rop.

Further according to the present invention a general arithmetic logic unit (ALU) receives source data and other operand(s) in an initial Blt operation, performs an operation thereon, and stores the resulting data in a storage circuit. In a subsequent Blt operation the data of the storage circuit may be used as an operand.

Further according to the present invention a method is provided to accomplish a general pixel blending function for such applications as motion compensation and alpha blending.

An advantage of the present invention is that it provides a Blt operation that can accelerate pixel blending functions.

Another advantage of the present invention is that it provides a Blt operation that can accelerate motion compensation in an MPEG decoding scheme.

Another advantage of the present invention is that it provides a Blt operation that can accelerate general pixel interpolation functions.

Other objects and advantages of the present invention will become apparent in light of the following description thereof.

BRIEF DESCRIPTION OF THE DRAWINGS

FIGS. 2*a–d* are block schematic diagrams illustrating conventional Blt operations of the Blt accelerator set forth in FIG. 1.

DETAILED DESCRIPTION OF THE EMBODIMENTS

Figure 1:
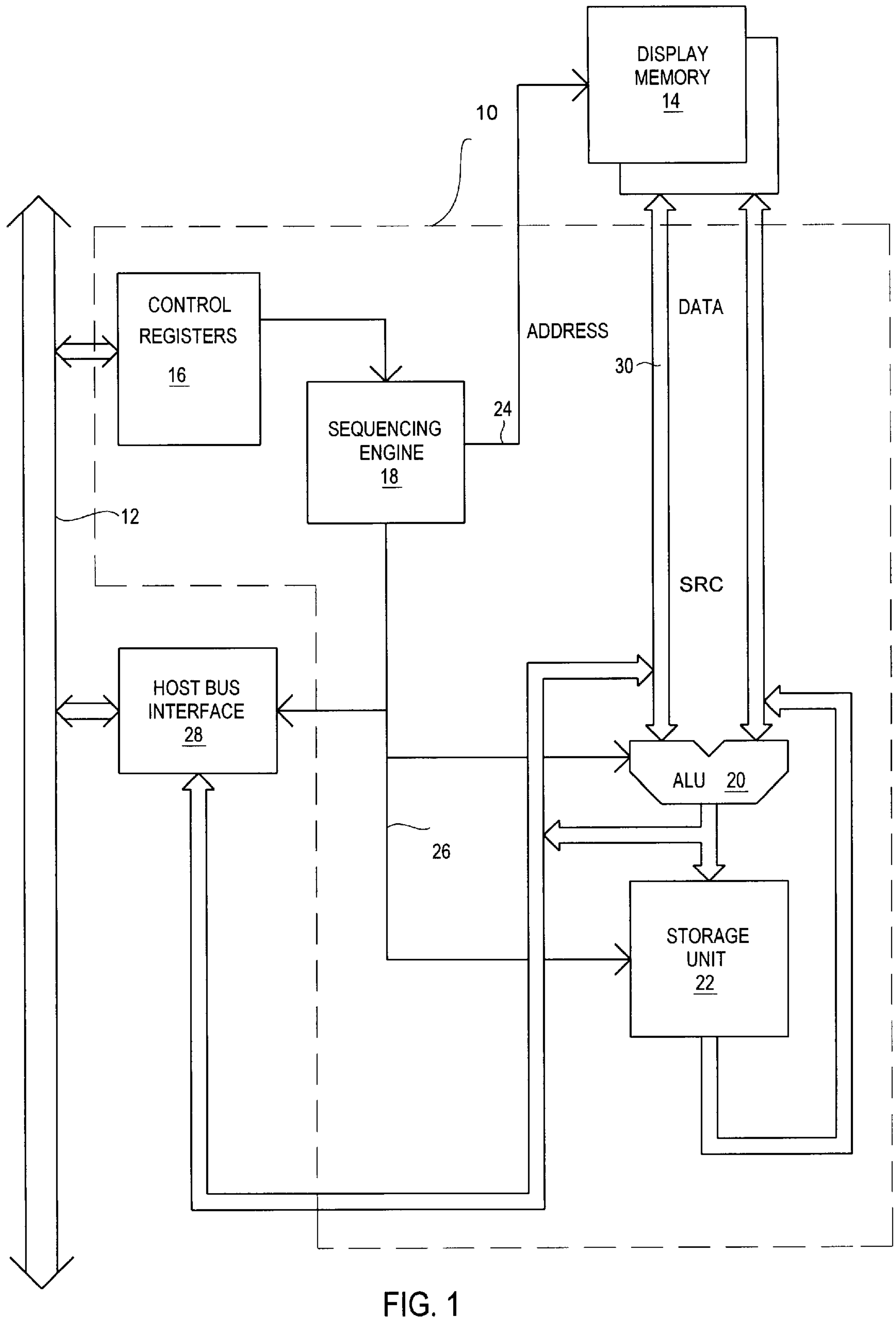
FIG. 1 is a block diagram illustrating a Blt accelerator according to a preferred embodiment of the present invention.

FIG. 1 sets forth, generally, a Blt accelerator apparatus according to the present invention. The Blt accelerator is designated by the general reference character 10 and is shown coupled to a host bus 12 and a display memory 14. In the preferred embodiment the Blt accelerator 10 is one portion of a graphics processor integrated circuit, with the display memory 14 being directly accessible by the Blt accelerator 10.

The Blt accelerator 10 includes a number of control registers 16, and can be conceptualized as further including a sequencing engine 18, an arithmetic logic unit (ALU) 20, and a data storage unit 22. The registers 16 receive Blt operation control values from the host bus 12. The sequencing engine 18 is coupled to registers 16, to the display memory 14 by way of a display memory address/control bus 24, and to the ALU 20 by way of Blt control signals 26.

The ALU 20 receives input operands that originate from a number of different system locations. Operands can be received directly from the host bus 12 via a host bus interface 28, from the display memory 14 by way of a display memory data bus 30, or from the data storage unit 22. The ALU 20 generates output values by performing an arithmetic, logic, or other combinational operation on its respective operands. The nature of the operation is determined by the values on the Blt control signals 26. The output of the ALU 20 is stored in the data storage unit 22 and/or coupled to the host bus interface 28 or display memory data bus 30.

The data storage unit 22 receives data from ALU 20 for use in subsequent cycles of the Blt accelerator 10 operation. The data storage unit 22 could be registers, latches, or some other memory/store configuration.

According to the present invention, the Blt accelerator 10 includes two different operating modes: a standard Blt and an "accumulate" Blt. It is noted that the standard Blt is known in the prior art and is used in this description to illustrate that the circuit of the present invention is reverse compatible with standard Blts, and to note the differences between a standard Blt and the accumulate Blt of the present invention. The standard Blt operating mode is illustrated by FIGS. 2*a–d.* In the preferred embodiment, the standard Blt begins by the host loading the desired parameters of the Blt operation into selected control registers 16 (not shown in FIGS. 2*a–d*), such as the location of the source data, the location of the destination data, and the type of rop be performed. The Blt operation is then started with a write to a start register.

Figures 2A, 2B:
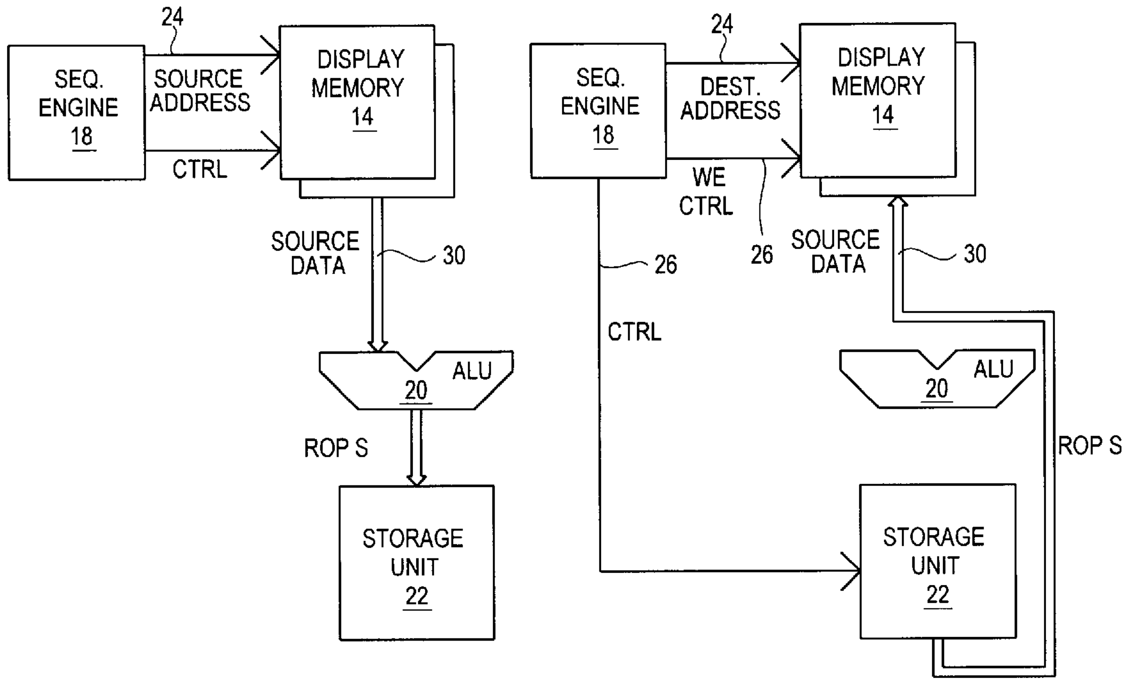

FIGS. 2*a–b* illustrate a standard Blt using only source data. For the purposes of this description it is assumed that the source data are situated in the display memory 14 and the rop is "~SOURCE" (i.e., the complement of the source data are written to the destination).

As set forth in FIG. 2*a,* the sequencing engine 18 generates a series of source addresses (SOURCE ADDRESS) on the display memory address bus 24 and accompanying control signals (CTRL) 26, resulting in a sequence of source data being placed on the display memory data bus 30. The source data are coupled to the ALU 20, which functions as a conventional ROP engine, and generates output values that are (in this case) the logical complement of the received input values. The resulting ALU 20 output (shown as ROP S) is input to the data storage unit 22. As set forth in FIG. 2*b,* once the ROP operation is complete for one block of data (enough to fill the data storage unit, or the entire remaining source region, if smaller than the size of the storage unit 22), the result is written to the destination location. The sequencing engine 18 generates a series of destination addresses (along with control signals for the display memory 14 and storage unit 22, including a write enable WE signal) and the ROP S data stored in the data storage unit 22 are placed on the display memory data bus 30 and written to the display memory 14 at the destination address location. The storage unit 22 is used to take advantage of the efficiencies of accessing display memory in a sequential or "burst" fashion, i.e. accessing display memory by a series of destination addresses. As is well known in the art, an equivalent Blt operation could be achieved by alternating source and destination accesses, but at considerable cost of efficiency.

FIGS. 2*c–d* illustrate a standard Blt that uses both the source and destination data. For the purposes of this description it is assumed both the source and destination data are situated in the display memory 14 and the rop is a logical "AND" function. Referring now to FIG. 2*c,* upon receiving the start command, the sequencing engine 18 generates a sequence of source display memory addresses (SOURCE ADDRESS) on the display memory address bus 24 with accompanying control signals (CTRL) 26. In response to the source addresses and control signals 26, the display memory 14 places source data (SOURCE DATA) on the display memory data bus 30. According to control signals 26 from the sequencing engine 18, the source data are read into the ALU 20, which performs no operation on the data, and simply passes the source data (S) on to the data storage unit 22, which stores the data from the ALU 20. At this point, the source data have been read into the Blt accelerator 10 and stored.

Referring now to FIG. 2*d,* the Blt operation continues as the sequencing engine 18 generates a second series of display memory addresses and control signals 26 for the destination data. In a similar manner as the source data, the destination data are read and input into the ALU 20. Concurrently, the sequencing engine 18 generates a series of data storage unit control signals 26 which read the stored source data as second operands to the ALU 20. The ALU 20 performs the predetermined rop (logical AND in this example) on the source and destination data to generate new destination data (shown as S ROP D). According to the destination addresses (and a write enable signal) generated by the sequencing engine 18 the new destination data are written back to the display memory data bus 30 using a read-modify-write operation. Alternatively, the output data S ROP D could be written back to the storage element until the entire block is done, then the block could be written back to the destination address.

It is noted that in the two cases of conventional Blt operation described above, each Blt operation uses the Blt storage unit 22 only within the operation; its contents are not preserved, or needed, for subsequent Blt operations. Note further, that the sequencing engine 18 is provided with source and destination addresses at the outset of a Blt command, and operand data comes from one or both of these addresses.

FIGS. 3*a–d* are provided to illustrate the novel accumulate Blt functions of the Blt accelerator 10. In contrast to the conventional Blt functions described above, in the present invention the source data or the resulting output data from a previous Blt operation can be retained for use in a subsequent Blt operation. In the preferred embodiment this capability gives rise to what will be referred to herein as "INITIATE" and "CONTINUE" Blts. In the INITIATE case, no data from a previous standard or accumulate Blt is used in the operation. Thus, the two conventional Blt functions described above in conjunction with FIGS. 2*a–d* would be considered INITIATE Blts. In the CONTINUE case, Blt data saved from the previous standard or accumulate Blt is used as an operand in generating the Blt output.

The accumulate Blt can also be a "WRITE" or "NO_WRITE" accumulate Blt. In the WRITE case, resulting accumulate Blt data are written to the host or display memory. In the NO_WRITE case, writes to the latter are suppressed. In the preferred embodiment, the INITIATE/CONTINUE and WRITE/NO_WRITE parameters are established when each accumulate Blt operation is initially set up by writing Blt parameter data to control registers 16. Prior art Blts could be conceptualized as permitting only INITIATE/WRITE Blts, typically with more limited rop capabilities than the general purpose arithmetic operations permitted by the present invention.

Figure 3A:
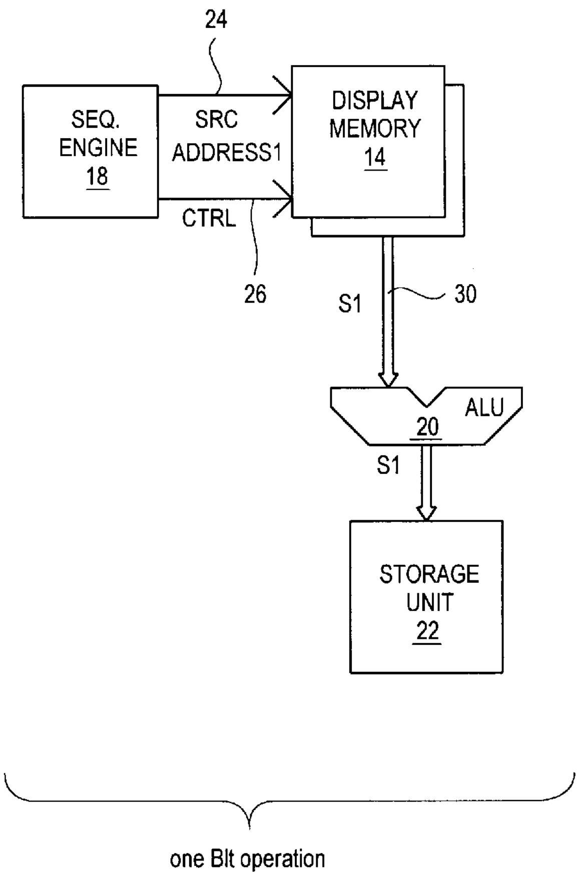
FIGS. 3*a–d* are block schematic diagrams illustrating the accumulate Blt operations of the Blt accelerator set forth in FIG. 1.
Figure 3B:
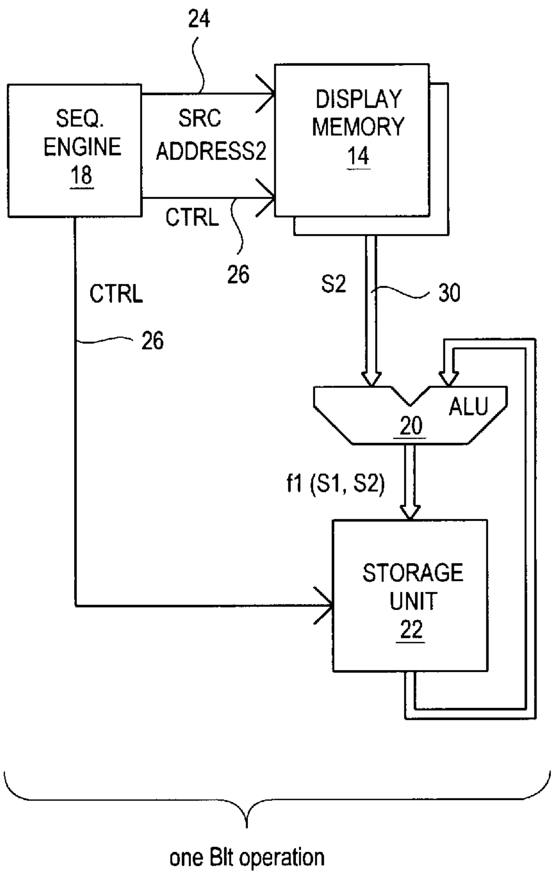
Figure 3C:
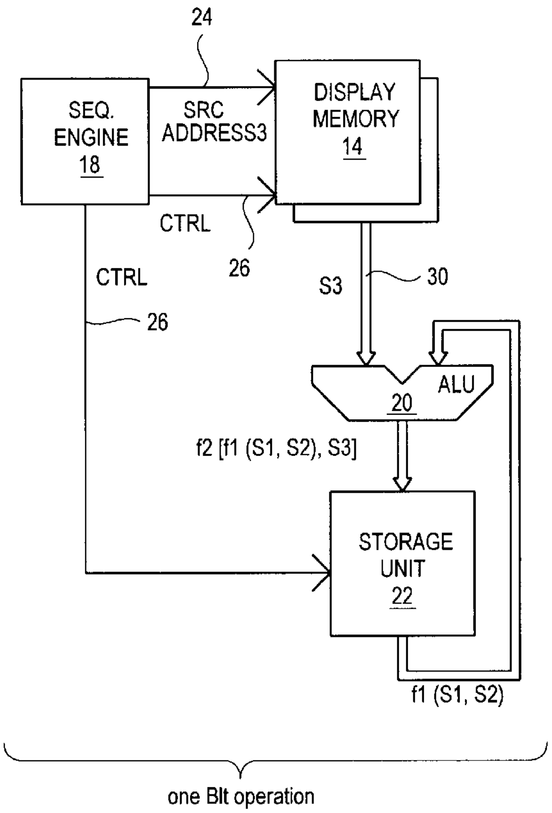
Figure 3D:
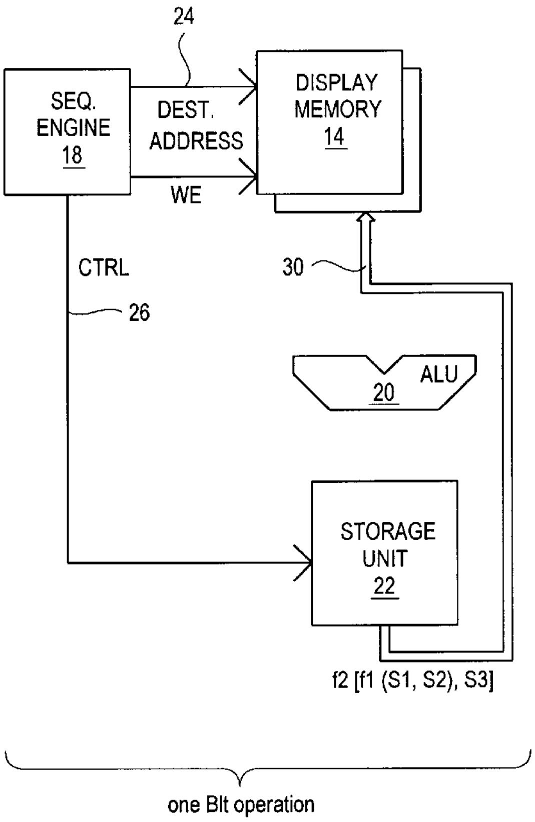

Referring now to FIGS. 3*a–d,* a sequence of three accumulate Blt operations are set forth. The three accumulate Blt operations accomplish a pixel blend operation according to a preferred embodiment. FIG. 3*a* illustrates an INITIATE, NO_WRITE accumulate Blt. FIG. 3*b* illustrates a CONTINUE, NO WRITE accumulate Blt. FIGS. 3*c–d* illustrate a CONTINUE, WRITE accumulate Blt, completing the operation. As described above, CONTINUE accumulate Blts utilize data from a previous Blt operation. In the particular sequence of FIGS. 3*a–c,* the INITIATE, NO_WRITE Blt of FIG. 3*a* establishes stored values. Referring now to FIG. 3*a,* in the INITIATE, NO_WRITE accumulate Blt shown, the sequencing engine generates a first set of source addresses (SRC ADDRESS1) resulting in first source data (S1) being placed on the display memory data bus 30. In the particular example set forth no arithmetic function is performed on the source data and the first source data are stored unmodified in the data storage unit 22. It is noted that the INITIATE, NO_WRITE case of FIG. 3*a* differs from the conventional Blt illustrated in FIGS. 2*a–*2*b,* in that no writing of data takes place, the Bit function serving the purpose of establishing the storage of data within the data storage unit 22 for use as operands in a subsequent operation. The operation of FIG. 3*a* differs from that of FIG. 2*a* in that it is a complete Blt operation in response to one self-contained host command, and following the operation of FIG. 3*a,* the Blt accelerator 10 is left in a state which a subsequent host-initiated operation can make use of. In contrast, the operation of FIG. 2*a* is but one portion of a Blt, and is automatically followed by the operation of FIG. 2*b*. Following the operation of FIG. 2*b* the state of the storage unit 22 is typically not preserved. It is also noted that while the particular example of FIG. 3*a* performs no arithmetic operation on the S1 data, for blending operations the data would be right-shifted, to generate fractional values of the original source data (e.g. ½, ¼, ⅛, etc.), as shown later in one of the methods of the present invention.

Referring now to FIG. 3*b* the CONTINUE, NO_WRITE accumulate Blt operation is illustrated. The sequencing engine 18 generates a second series of source addresses (shown as SRC ADDRESS2) resulting in a second set of source data (S2) being read from the display memory 14 as first operands into the ALU 20. Because FIG. 3*b* is a CONTINUE type Blt, the data from the previous Blt operation (the operation of FIG. 3*a*) are simultaneously read from the data storage unit 22 into the ALU 20 as second operands. The ALU 20 performs a predetermined operation on the data and the resulting output (shown as a function of S1 and S2) is stored once again (i.e., accumulated) in the data storage unit 22. In the case of a blend operation, each new operand would be right shifted to generate the appropriate fractional value thereof, as discussed later.

Referring now to FIGS. 3*c–d,* the CONTINUE, WRITE accumulate Blt operation is illustrated. (While the particular operation of FIG. 3*c* does not utilize destination data, a WRITE accumulate using destination data is also possible, and would be similar to the example set forth.) The sequencing engine 18 generates a third series of source addresses (SRC ADDRESS3) on the display memory address bus 24 producing a third set of source data (S3) on the display memory data bus 30. The data serve as operands for the ALU 20. Because the Blt operation is a CONTINUE operation, the stored output from the previous Blt operation are coupled as to the ALU 20 as second operands. The ALU 20 performs a predetermined operation on the data, and the output (shown as a function of S3 and the previous output) is stored in the data storage unit 22. Unlike the previous NO_WRITE cases of FIGS. 3*a* and 3*b,* the operation of FIGS. 3*c–d* is a WRITE accumulate Blt. As set forth in FIG. 3*d,* the sequencing engine 18 generates a series of destination addresses (DEST ADDRESS) and write enable signals for the display memory 14, while coupling the data in the data storage unit 22 to the display memory data bus 30. In this manner, the values and output from step 3*c* are written to the destination location in the display memory 14.

Figure 4:
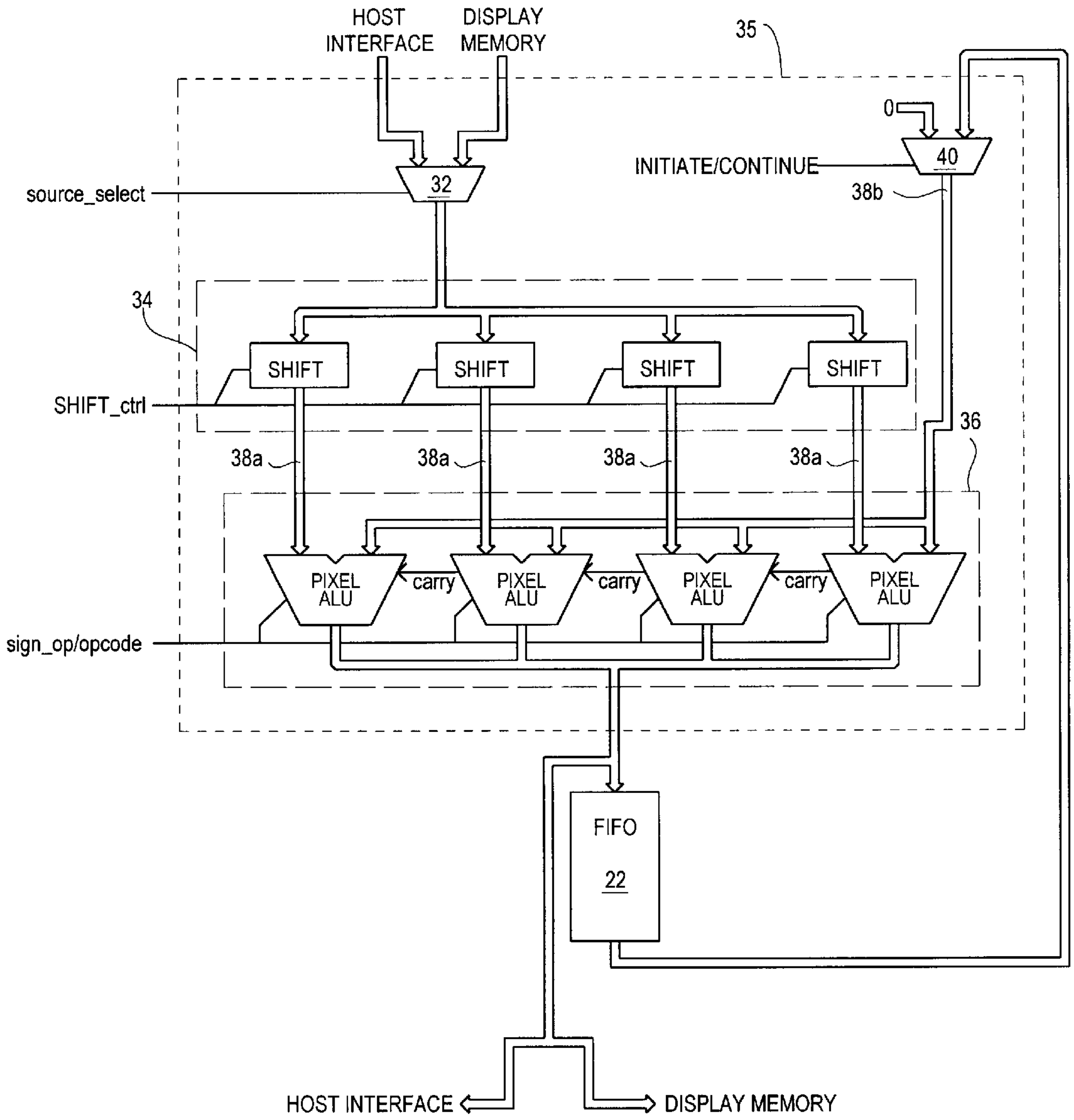
FIG. 4 is a detailed block diagram illustrating an arithmetic logic unit according to one embodiment of the present invention.

Referring now to FIG. 4, a detailed block schematic diagram illustrates portions of the ALU 20 and data storage unit 22 according to one embodiment of the present invention. In the embodiment of FIG. 4, the data storage unit 22 is a first-in-first-out buffer (FIFO) that is 32-bits wide and 16 words deep. The host data or display memory data are received by a data input MUX 32. The data input MUX 32 is responsive to a source_select control signal generated by the Blt engine that varies according to the Blt set up parameters. For example, in a screen-to-screen Blt, source_select remains high, and only data from the display memory are passed. In a host-to-screen Blt, source_select is low as source data from the host bus interface 28 are clocked in into the FIFO 22, and then goes high to clock in the destination data, if needed, from the display memory 14. In this manner input data are coupled from either the host bus 12 or display memory 14 to a logical shift circuit 34, such as a barrel shifter.

In the embodiment of FIG. 4, the logical shift circuit 34 of an arithmetic logic unit (ALU) 35 receives a 32-bit data input and can shift each of the four 8-bit bytes therein to the left or to the right according to a SHIFT_ctrl signal, sign extending and truncating within each 8-bit byte. As will be explained in more detail the addition of a shift option to the standard rops enables the Blt accelerator 10 to accelerate a variety of different display functions. The output of the shift circuit 34 is coupled to an ADDER/rop circuit 36 within the ALU 35.

The ADD/rop circuit 36 of the preferred embodiment has two pixel inputs 38*a* and 38*b*. Inputs 38*a* receive values from the shift circuit 34 and input 38*b* receives values from the storage unit 22, or a null constant, by way of an INITIATE/CONTINUE MUX 40. The ADD/rop circuit 36 executes standard rops, plus signed and unsigned addition and subtraction with saturation. A sign_op control signal indicates whether the incoming data are signed or not. An opcode indicates which arithmetic or logical function is to be performed by the ADD/rop circuit 36. These operations can be performed between 8-bit, 16-bit and 32-bit values. The particular implementation of such ADD/rop circuits 36 is well understood in the art, and so will not be discussed in further detail. The output of the ADD/rop circuit 36 is written back to the data storage unit 22 and optionally to a destination address or host interface, depending on the predetermined write parameters.

The INITIATE/$\overline{\text{CONTINUE}}$ MUX 40 controls use of accumulated data from previous Blts. The INITIATE/$\overline{\text{CONTINUE}}$ MUX 40 is responsive to a INITIATE/$\overline{\text{CONTINUE}}$ signal which, like the source_select signal, depends upon the Blt set up parameters. In the first step of an INITIATE accumulate Blt or a standard Blt, the INITIATE/$\overline{\text{CONTINUE}}$ signal is high and suppresses the stored data from being coupled to the ALU 20, and providing a NULL operand in its place. In the second step of an INITIATE accumulate Blt (i.e., destination operand), and throughout a CONTINUE accumulate Blt, the INITIATE/CONTINUE signal is low, and accumulated data are coupled as operands to the ALU 20.

It is noted that while the embodiment of FIG. 4 sets forth one shift circuit 34 in a particular location, this implementation should not be construed as limiting the scope of the present invention. Shifter circuits or other arithmetic operations could be situated at both inputs to the ALU circuit 35 and/or at the output of the ALU circuit 35, the latter being suitable for maintaining precision in a series of arithmetic operations.

Because the particular embodiment of FIG. 4 utilizes a FIFO 22, it is understood that while data stored in the FIFO are being clocked out to the ALU data path 20, the resulting ALU output data are being clocked into the FIFO 22. One skilled in the art would recognize that other storage elements could be employed.

Figure 5A:
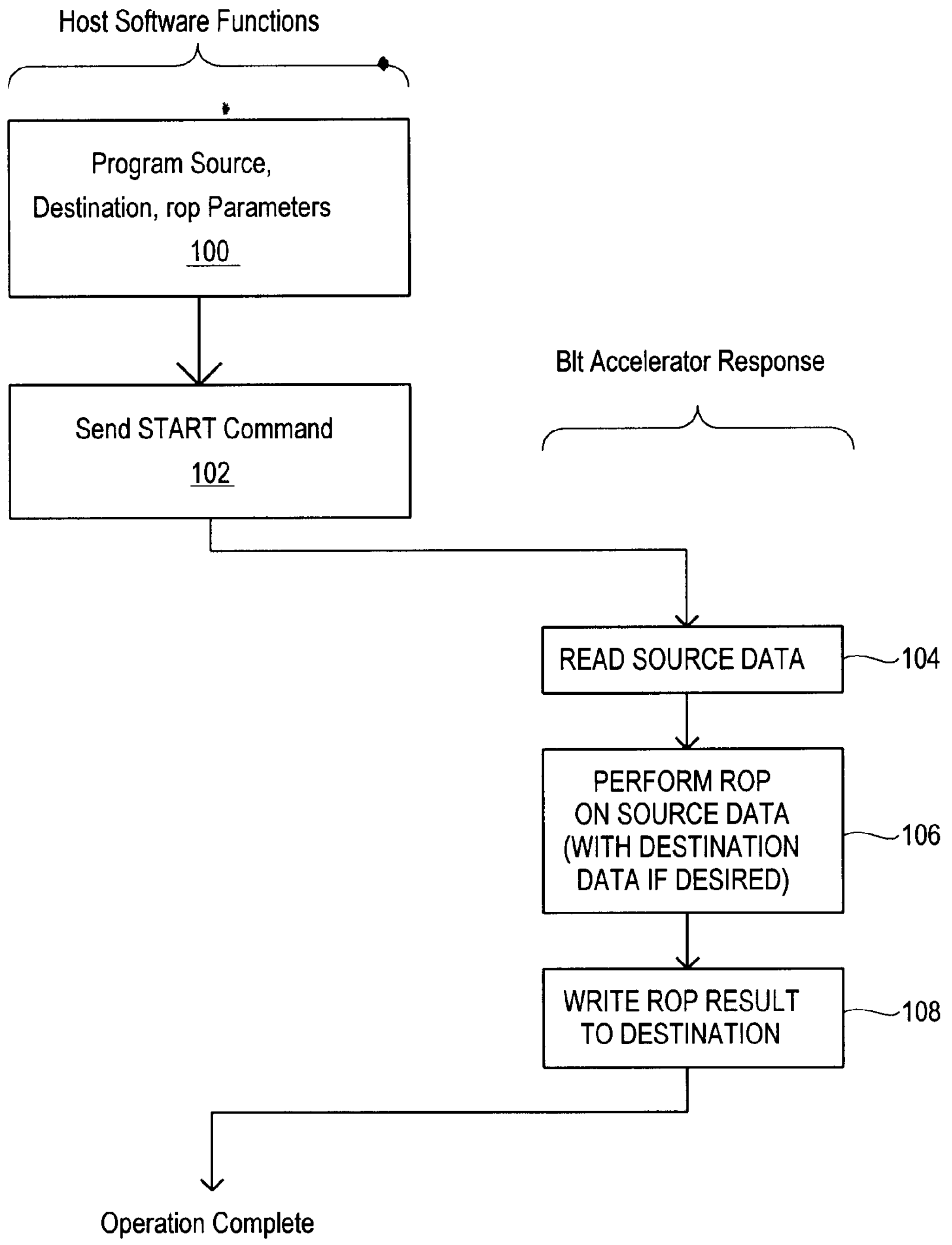
FIGS. 5*a* and 5*b* are flow diagrams illustrating methods for standard and accelerated Blt operations according to a preferred embodiment.

Referring now to FIG. 5*a*, a method for a standard Blt operation is set forth in a flow diagram form. The flow diagram is divided into a left column and a right column. The left column illustrates steps performed by software (typically in a graphics driver) and the right column illustrates action performed by accelerator hardware. The software establishes the Blt parameters (step 100). A start command is then sent to initiate the Blt hardware (step 102). The accelerator hardware reads source data into the Blt engine (step 104), a rop is performed on the source data (step 106) and the data are written to a destination location (step 108).

Figure 5B:
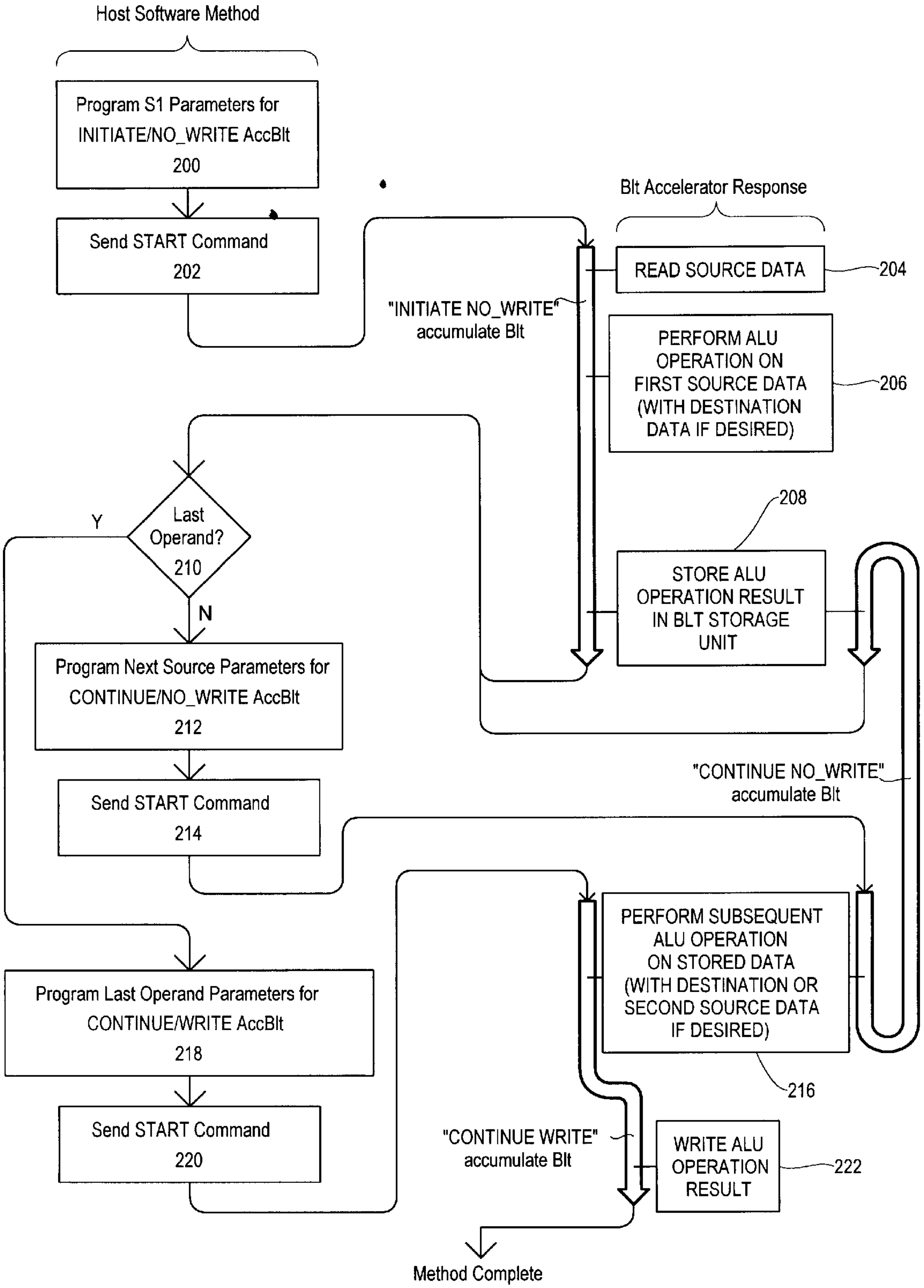

Use of the preferred embodiment of the present invention is illustrated in FIG. 5*b*. The method set forth is designed to accomplish a given pixel acceleration function by consecutive ALU operations on several source operands. In a similar manner to FIG. 5*a*, FIG. 5*b* includes a left column, illustrating steps that are performed in software, and a right column, illustrating actions executed the Blt accelerator.

The software begins by programming the Blt accelerator for an INITIATE/NO WRITE operation on S1 data (step 200). As previously described, in the preferred embodiment this is accomplished by a host write to control registers. The Blt accelerator operation is then started by the software sending a START command (step 202). Hardware dependent actions follow once the Blt accelerator is activated. As in the case of the conventional Blt operation, first source data are read into the Blt engine (204) using an INITIATE Blt-however unlike the standard Blt this is a NO_WRITE operation. An ALU operation is optionally performed on the source data (206). The results of the first ALU operation are stored in a Blt storage unit (208). These three hardware dependent actions (204–208) accomplish the INITIATE/NO_WRITE Blt operation.

Depending upon whether or not the last operand has been reached, the software either sets up the second source data parameters for a CONTINUE/NO_WRITE Blt (step 212), or continues on to a CONTINUE/WRITE Blt operation. In the case of the former, the Blt accelerator is started once more by the software sending a start command (step 214). The Blt hardware performs a subsequent ALU operation on the previously stored source data (216). In the particular example described herein, the ALU operation is performed with the second source data as an operand. Because the Blt is a CONTINUE Blt, the results of the previous ALU operation are coupled from the Blt storage unit as an operand (a return to action 208). Thus the hardware actions 216 followed by 218 accomplish the CONTINUE/NO_WRITE Blt operation. The software repeats steps 210–214 (and the resulting accelerator actions 214–208) until the last operand is to be used.

Once the last operand has been reached, the software programs the last operand parameters and sets up a CONTINUE/WRITE Blt (step 218). The CONTINUE/WRITE Blt is started by the software sending a start command (step 220). The Blt accelerator performs a final ALU operation on the stored data and the last operand (214), and the resulting output is written (222). Thus, the CONTINUE/WRITE Blt is accomplished by steps 216 and 222.

Embodiments of the method according to the present invention may also be described by a series of single function calls to a graphics chip driver. The function call parameters specify the set up information for the accumulate Blt. An example of such a function call is set forth below:

AccBlt (Source Base, Source Address, Destination Base, Destination Address, Size X, Size Y, Direction X, Direction Y, Shift, opcode, INIT/CONT?, Signed?, Write?).

The initial parameters of the AccBlt function are the same as standard Blt parameters. "Source Base" indicates the origin of the source data (host or display memory). In the event the display memory is selected, "Source Address" will point to the starting point of the source data. Similarly, the "Destination Base" and "Destination Address" indicate the destination location. "Size X" and "Size Y" define the rectangular extents of the Blt. "Direction X" and "Direction Y" control the operation of Blt address counters for increasing or decreasing the address count.

The remaining parameters are unique to the novel AccBlt function of the preferred embodiment. An arithmetic shift parameter is specified by the "Shift" field which provides a right shift operation of −1 to 3 bits in the preferred embodiment. The INIT/CONT? field indicates whether the accumulate Blt is of the INITIATE or CONTINUE type as previously described. The "Signed?" field indicates whether the incoming source data includes a sign bit. The "Write?" field enables or disables a write to the destination location. For the particular embodiment of FIG. 3, it follows that the Source and Destination Base values determine the sequence of the source_select signal, the INIT/CONT? value will determine the INITIATE/CONTINUE signal sequence, the Signed? value is used to derive the sign_op signal, and SHIFT_ctrl is determined according to the Shift value.

The AccBlt operation of the present invention provides acceleration to a variety of functions beyond those provided by conventional Blt accelerators. One particular function that can be accelerated by the present invention is the motion compensation portion of an MPEG or other video decoding operation. Motion compensation involves the averaging of two or more blocks of data, and the addition of signed data, to generate an output block of data.

Embodiment 1—Motion Compensation, Reference+Difference

An example method accomplishing one type of a motion compensation decoding operation follows. This method is appropriate for a block generated as the sum of one reference block plus a difference block, such as a block in an MPEG P-frame. The output block for one color component is an eight by eight block of 8-bit pixels, with an upper left corner located at ADDRout in the display memory, computed in this example for one reference frame and a block of difference data. The source (reference) block is located at ADDRref1. An array of difference values is provided by the host. Two AccBlt function calls are used.

The first function call loads the eight by eight block at location ADDRref1 into the FIFO 22.

| | |
|---|---|
| AccBlt (Source Base: Display Memory | Source Address: ADDRrefl |
| Destination Base: null | Destination Address: null |
| Size X: 8 | Size Y: 8 |
| Right Shift: 0 (no shift) | INIT: 1(INITIATE type AccBlt) |
| Signed?: 0 (input data not signed) | Write?: 0 (no write of output) |
| opcode: null) | |

The second function call takes difference pixel data from the host. The source data received are assumed to be encoded in signed 8-bit values, and so ranges in value from −128 to +127. The source data must be left shifted by one bit to provide difference values from −256 to +254:

| | |
|---|---|
| AccBlt (Source Base: Host | Source Address: 0, 0 |
| Destination Base: display memory | Destination Address: ADDRout |
| Size X: 8 | Size Y: 8 |
| Right Shift: −1 (left shift by one bit) | INIT: 0(CONTINUE type AccBlt) |
| Signed?: 1 (input data is signed) | Write?: 1 (output written to destination) |
| opcode: Add with saturation) | |

The difference data and the reference data from the previous AccBlt are saturation added, and then output to the eight by eight block beginning at 8, 24.

Embodiment 2—Motion Compensation. Multiple References+Differences

An example averaging more than one reference block follows:

In the first function call a block from a first reference frame beginning at ADDRref1 is shifted right by one bit as it is read into the FIFO. This generates reference block 1 values, divided by two for the averaging of block 1 with block 2.

AccBlt (Source Base: Dis. Mem.; Source Add: ADDRref1; Dest. Base: null; Dest. Add: null; Size X: 8; Size Y: 8; Right Shift: +1; INIT: 1; Signed?: 0; Write?: 0; opcode: null)

In the second function call, the values of a second block beginning at ADDRref2 are divided by two and added to the values in the FIFO. The result, the average of the first frame block and second frame block is stored back in the FIFO.

AccBlt (Source Base: Dis. Mem.; Source Add: ADDRref2; Dest. Base: null; Dest. Add: null; Size X: 8; Size Y: 8; Right Shift: +1; INIT?:0; Signed?: 0; Write?: 0; opcode: Sat. Add)

In the third function call, the difference block is added to the average of the first and second reference blocks, and then output to an output block.

AccBlt (Source Base: host; Source Add: 0, 0; Dest. Base: Dis. Mem.; Dest. Add: ADDRout; Size X: 8; Size Y: 8; Right Shift: −1; INIT?: 0; Signed?: 1; Write?: 1; opcode: Sat. Add)

Embodiment 3—Half-Pixel Interpolation

It follows from the previous embodiments that by using the same source block multiple times, offset by one pixel in the X or Y direction and with values right-shifted for divide by 2, 4, or 8, half-pixel interpolation could be achieved. A general method is set forth below.

Pseudocode Subroutine LOADREF used in P or B block Half Pixel Interpolation

```
subroutine LOADREF (X, Y, Rtshift, last?, first?, ADDRout)
  if (X and Y not half pixels)
    AccBlt (Source Base: Disp. Mem.; Source Add: X, Y; Dest. Base: Disp. Mem.; Dest. Add.: ADDRout; Size X: 8, Size Y: 8; Right Shift: Rtshift; INIT?: first?; Signed: 0(no): Write?: last?; opcode: Sat. Add)
  if (X or Y half pixels, not both)
    AccBlt (Source Base: Disp. Mem.; Source Add: X, Y; Dest. Base: Disp. Mem.; Dest. Add.: ADDRout; Size X: 8, Size Y: 8; Right Shift: Rtshift+1; INIT?: first?; Signed: 0(no): Write?: 0(no); opcode: Sat. Add)
  if (X half pixel) X=X+1 else Y=Y+1
    AccBlt (Source Base: Disp. Mem.; Source Add: X, Y(one is incremented); Dest. Base: Disp. Mem.; Dest. Add.: ADDRout; Size X: 8, Size Y: 8; Right Shift: Rtshift+1; INIT?: 0(continue); Signed: 0(no): Write?: last?; opcode: Sat. Add)
  if (X and Y half pixels)
    AccBlt (Source Base: Disp. Mem.; Source Add: X, Y; Dest. Base: Disp. Mem.; Dest. Add.: ADDRout; Size X: 8, Size Y: 8; Right Shift: Rtshift+2; INIT?: 0(continue); Signed: 0(no): Write?: 0(no); opcode: Sat. Add)
    AccBlt (Source Base: Disp. Mem.; Source Add: X+1, Y; Dest. Base: Disp. Mem.; Dest. Add.: ADDRout; Size X: 8, Size Y: 8; Right Shift: Rtshift+2; INIT?: 0(continue); Signed: 0(no): Write?: 0(no); opcode: Sat. Add)
    AccBlt (Source Base: Disp. Mem.; Source Add: X, Y+1; Dest. Base: Disp. Mem.; Dest. Add.: ADDRout; Size X: 8, Size Y: 8; Right Shift: Rtshift+2; INIT?: 0(continue); Signed: 0(no): Write?: 0(no); opcode: Sat. Add)
    AccBlt (Source Base: Disp. Mem.; Source Add: X, Y; Dest. Base: Disp. Mem.; Dest. Add.: ADDRout; Size X: 8, Size Y: 8; Right Shift: Rtshift+2; INIT?: 0(continue); Signed: 0(no): Write?: last?; opcode: Sat. Add)
  end subroutine
```

Pseudocode Main routine for a P block (one reference block+one difference block)

```
  routine P_BLOCK
  if (difference pixels exist) last?=0(no) else last?=1(yes)
    LOADREF(X, Y, Rtshift=0, last?, first?=1(yes), ADDRout)
  if (difference pixels)
  AccBlt (Source Base: Host; Source Add: null; Dest. Base: Disp. Mem.; Dest. Add.: ADDRout; Size X: 8, Size Y: 8; Right Shift: −1; INIT?: 0(continue); Signed: 1(yes): Write?: 1(yes); opcode: Sat. Add)
  end P_BLOCK
```

Pseudocode Main routine for a B block (two reference blocks+one difference block)

```
  routine B_BLOCK
  LOADREF (X1, Y1, Rtshift=1, last?=0(no), first?=1(yes))
  if (difference pixels exist) last?=0(no) else last?=1(yes)
  LOADREF (X2, Y2, Rtshift=1, last?=0(no), first?=0(no))
  if (difference pixels)
    AccBlt (Source Base: Host; Source Add: null; Dest. Base: Disp. Mem.; Dest. Add.: ADDRout; Size X: 8, Size Y: 8; Right Shift: −1; INIT?: 0(continue); Signed: 1(yes): Write?: 1(yes); opcode: Sat. Add)
  end B_BLOCK
```

In addition to the particular motion compensation examples illustrated herein other operations may be accelerated by the present invention. Alpha blending effects could be accomplished by reading and logical-shifting pixel values from one region to generate a first blend component. The first blend component can be added to a second blend component by subsequent reads, shifts and adds from a second region. The acceleration of pixel value interpolation also follows from the above example as, for example, to low pass filter an upscaled image generated by replication. To interpolate between adjacent pixels, a first set of data may be read into the FIFO with a one bit right shift operation to halve the input values (with a INITIATE type AccBlt). A second AccBlt call, with a source address offset by one pixel and the same one bit shift, will produce interpolated values. Linear interpolation between four values naturally follows. Further, with a wider range of shift options, more advanced filtering effects (for texture filtering as an example) may also be accomplished. One skilled in the art would recognize that the methods for such operations follow from the examples set forth herein.

It is understood that the embodiments set forth herein are only some of the possible embodiments of the present invention, and that the invention may be changed, and other embodiments derived, without departing from the spirit and scope of the invention. Accordingly, the invention is intended to be limited only by the appended claims.

What is claimed is:

1. In a computer graphics system, an apparatus for accelerating pixel raster and other operations, comprising:

arithmetic logic (ALU) means for receiving input values and performing selected arithmetic/logic operations thereon to generate a block of output data values;

storage means for storing a block of output data values from said ALU means;

first means for coupling source data as input values to said ALU means to generate initial output data values from said ALU means;

second means responsive to at least one control signal for coupling the initial output data values from said ALU means to said storage means according to the control signal value;

third means for coupling the initial output data values stored in said storage means to said ALU as input values to generate accumulated output data values from said ALU means;

fourth means responsive to the at least one control signal for coupling the accumulated output data values from said ALU means to said storage means according to the control signal value;

fifth means for sequencing individual output data values in the block of output data values through said ALU means for processing one output data value at a time; and first shift means for logically or arithmetically shifting accumulated output data values or initial output data values prior to coupling the output data values as input values to said ALU means.

2. The apparatus of claim 1, including:

second shift means for logically or arithmetically shifting the output data values of the block of output data values from said ALU means.

3. In a graphics accelerator integrated circuit, a combination for executing an improved Blt operation, comprising:

an arithmetic logic unit (ALU) having at least two ALU inputs and an ALU output, at least one of said ALU inputs receiving external data, said ALU includes a data shift circuit for logically or arithmetically shifting data a selected number of bits to the left or right;

a Blt storage element having a plurality of data storage locations, said Blt storage element being coupled to the ALU output and at least one ALU input; and a Blt memory control and sequencing circuit for iteratively coupling data stored in said Blt storage element to the at least one ALU input and storing resulting accumulated data from the ALU output in said Blt storage element.

4. In a computer graphics system, a method for accelerating a pixel display operation, comprising the steps of:

(a) reading an initial block of source data from a host or display memory as operands to an arithmetic logic unit (ALU) and logically or arithmetically shifting the data of the initial block of source data;

(b) storing the output of the ALU as an initial block of data in a BLT engine storage unit; and (c) reading the initial block of data from the BLT engine storage unit as one set of operands of the ALU and reading an additional block of source data from a host or display memory as a second set of operands to an arithmetic logic unit (ALU) and logically or arithmetically shifting the data of the additional block of source data; and repeating steps (b) and (c) to generate a block of data that is the average of the initial block of source data and the additional blocks of source data.

5. A method for accelerating a multiple comprising of pixel data from different sources, comprising the steps of:

(a) reading an initial source pixel data block from a source location to an arithmetic logic unit, said initial source pixel data block being a first reference block of data, and performing a null operation on the initial source pixel data block;

(b) performing an initial arithmetic logic operation on the source pixel data block to generate a first block of modified pixel data;

(c) storing the first block of modified pixel data in a Blt store;

(d) reading the first block of modified pixel data from the Blt store to the arithmetic logic unit;

(e) performing a subsequent operation with the data stored in the Blt store as one set of sequential operands and a subsequent block of source pixel data as a second set of sequential operands to generate a block of accumulated pixel data, the subsequent block of pixel data being a difference block of data, and the subsequent operation being an add operation; and (f) storing the accumulated pixel data in the Blt store.

6. A method for accelerating a multiple comprising of pixel data from different sources, comprising the steps of:

(a) reading an initial source pixel data block from a source location to an arithmetic logic unit;

(b) performing an initial arithmetic logic operation on the source pixel data block to generate a first block of modified pixel data, and performing a shift operation on the first reference block of data;

(c) storing the first block of modified pixel data in a Blt store;

(d) reading the first block of modified pixel data from the Blt store to the arithmetic logic unit;

(e) performing a subsequent operation with the data stored in the Blt store as one set of sequential operands and a subsequent block of source pixel data as a second set of sequential operands to generate a block of accumulated pixel data, the subsequent block of pixel data being a second reference block of data, and the subsequent operation being a combination shift and add operation; and (f) storing the accumulated pixel data in the Blt store.

7. A graphics operation accelerator for compositing stored data, comprising:

means for providing initial source data parameter information, the initial source data parameter information defines a block from a reference frame;

means for providing an initialize signal;

means for providing last source data parameter information, the last source data parameter information defines a block from a difference frame;

means for providing a write signal; and

Blt accelerator means for a) reading source data based upon the initial source data parameter information, b) performing an initial arithmetic/logic operation on at least one operand to generate output data, the initial arithmetic/logic operation being a null operation, c) storing output data, d) performing a subsequent arithmetic/logic operation on at least the stored output data the subsequent arithmetic operation being a saturation add of the previously stored output data and the block from the difference frame, and e) writing final output data, the written final output data being a motion compensated block of pixel data from the one block of the reference block and the one block from the difference data, wherein said Blt accelerator means performing functions a), b), and c) in response to the initialize signal, and performing functions d) and e) in response to the write signal.

8. A graphics operation accelerator for compositing stored data, comprising:

means for providing initial source data parameter information, the initial source data parameter information defining a first block from one display region;

means for providing an initialize signal;

means for providing last source data parameter information, the last source data parameter information defines a second block from another display region;

means for providing a write signal; and

Blt accelerator means for a) reading source data based upon the initial source data parameter information, b) performing an initial arithmetic/logic operation on at least one operand to generate output data, the initial arithmetic/logic operation being a right shift operation for generating fractional values of the block from the first display region, c) storing output data, d) performing a subsequent arithmetic/logic operation on at least the stored output data, the subsequent arithmetic operation being a right shift of the second block to generate fractional values thereof, followed by a saturation add of the previously stored output data and shifted second block, and e) writing final output data, the final written output data being a blend of the first block and the second block, wherein said Blt accelerator means performing functions a), b), and c) in response to the initialize signal, and performing functions d) and e) in response to the write signal.

9. A graphics operation accelerator for compositing stored data, comprising:

means for providing initial source data parameter information, the initial source data parameter information defines a block from a first reference frame;

means for providing an initialize signal;

means for providing subsequent source data parameter information, the subsequent source data parameter information defines a block from a second reference frame;

means for providing a continue signal;

means for providing last source data parameter information, the last source data parameter information defines a block from a difference frame;

means for providing a write signal; and

Bit accelerator means for a) reading source data based upon the initial source data parameter information, b) performing an initial arithmetic/logic operation on at least one operand to generate output data, the initial arithmetic/logic operation being a right shift operation, c) storing output data, d) performing a subsequent arithmetic/logic operation on at least the stored output data, wherein the subsequent arithmetic operation associated with the continue signal being a saturation add of the previously stored output data and the block from the second reference frame, right shifted, and the subsequent arithmetic operation associated with the write signal being a saturation add of the previously stored output data and the block from the difference frame, and e) writing final output data, the final written output data being a block for a motion compensated block of pixel data from the block from the first reference frame, the block from the second reference frame, and the block from the difference frame, wherein said Blt accelerator means performing functions a), b), and c) in response to the initialize signal, performing the functions b) and c) in response to the continue signal, and performing functions d) and e) in response to the write signal.

* * * * *